United States Patent
Nieves

(10) Patent No.: US 6,202,340 B1
(45) Date of Patent: Mar. 20, 2001

(54) ELECTRONICALLY ACTUATED ANIMAL TRAP

(76) Inventor: Joniel Nieves, 6912 E. Creek Dr., Tampa, FL (US) 33615

(*) Notice: Subject to any disclaimer, the term of this patent is extended or adjusted under 35 U.S.C. 154(b) by 0 days.

(21) Appl. No.: 09/376,907

(22) Filed: Aug. 18, 1999

(51) Int. Cl.⁷ .................................................. A01M 23/02
(52) U.S. Cl. .................................................................. 43/61
(58) Field of Search ............................................ 43/60, 61

(56) References Cited

U.S. PATENT DOCUMENTS

| | | |
|---|---|---|
| 1,488,312 | 3/1924 | Bronson . |
| 2,437,507 * | 3/1948 | Crumrine ................................. 43/61 |
| 2,448,780 | 9/1948 | Crumrine . |
| 2,490,017 | 12/1949 | Crumine . |
| 2,544,026 * | 3/1951 | Kern ........................................ 43/61 |
| 2,769,273 * | 11/1956 | Martin ..................................... 43/61 |
| 3,113,395 | 12/1963 | Kuren . |
| 3,508,358 | 4/1970 | Lee . |
| 4,062,142 | 12/1977 | Marotti . |
| 4,138,796 | 2/1979 | Souza . |
| 4,159,590 | 7/1979 | Palfalvy . |
| 4,180,937 * | 1/1980 | Webster ................................... 43/87 |
| 4,835,900 * | 6/1989 | Shifflett ................................... 43/58 |
| 4,899,484 * | 2/1990 | Morin ...................................... 43/61 |
| 5,107,619 | 4/1992 | Zapata et al. . |
| 5,199,210 | 4/1993 | Nastas . |
| 5,345,710 | 9/1994 | Bitz . |
| 5,778,594 | 7/1998 | Askins et al. . |
| 5,862,624 | 1/1999 | Askins . |
| 5,867,934 | 2/1999 | Conover . |
| 5,953,853 * | 9/1999 | Kim ......................................... 43/98 |
| 6,003,265 * | 12/1999 | Lundgren ................................. 43/61 |
| 6,016,623 * | 1/2000 | Celestine ................................. 43/61 |

FOREIGN PATENT DOCUMENTS 2 209 133   5/1989   (GB) .

* cited by examiner

Primary Examiner—Kurt Rowan
(74) Attorney, Agent, or Firm—Anton J. Hopen; Smith & Hopen, P.A.

(57) ABSTRACT

An electronically actuated animal trap for humanely capturing animals within an enclosure having an animal access opening through which an animal is drawn by bait. A swingably hinged vertically oriented trigger panel is disposed between the animal access opening and the bait area. As the animal attempts to enter the bait area, the vertically oriented trigger panel swings towards the bait closing an electric circuit powering a solenoid. The solenoid retracts at least one pin received through apertures formed in a vertically sliding door panel mounted to the animal access opening thereby causing the sliding door panel to vertically drop from a first raised configuration to a second lowered configuration. Consequently, the animal access opening is closed off by the sliding door panel effectively trapping the animal within the enclosure.

16 Claims, 4 Drawing Sheets

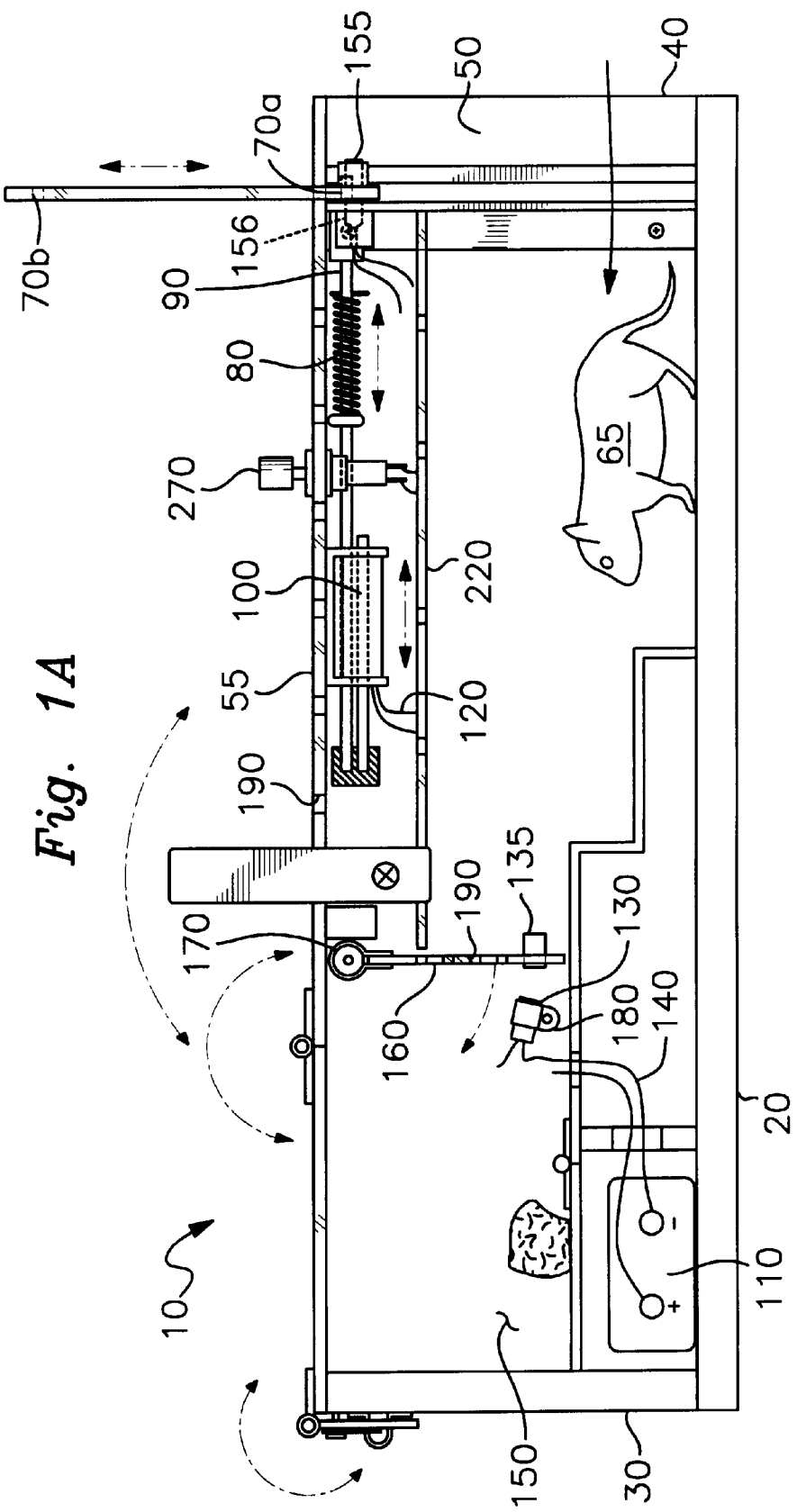
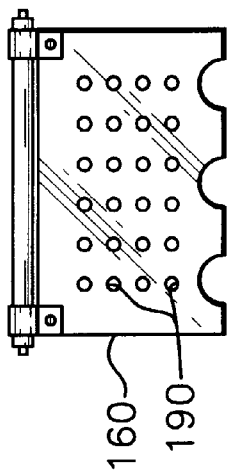
Fig. 1A
Fig. 1B

ELECTRONICALLY ACTUATED ANIMAL TRAP

FIELD OF INVENTION

The present invention relates generally to traps for animals. More specifically, the invention relates to a trap for harmlessly capturing an animal with a novel trigger mechanism.

BACKGROUND OF THE INVENTION

Animal traps are well known in the prior art. Typical traps generally comprise an enclosure having at least one open end in which the animal enters. Upon activating a triggering mechanism, a door closes over the open end, trapping the animal inside. Many traps in the prior art are designed to kill or maim the trapped animal. United Kingdom Patent No. 2,209,113 to Waling describes an electronically actuated spring-loaded mouse trap which kills or maims the quarry upon use. U.S. Pat. No. 5,107,619 to Zapata et al. describes an electric mouse trap wherein a sensor underneath the bait triggers a solenoid to trap or impale the animal directly, thereby causing severe injury or death to the animal. U.S. Pat. No. 4,062,142 to Marotti describes a trap for mice in which upon disturbance of the bait, an electrical motor encloses the animal and poisonous gas is then pumped into the enclosure. U.S. Pat. No. 2,490,017 to Crumrine describes an animal trap that mutilates, electrocutes, then ejects the animal's body away from the apparatus. U.S. Pat. No. 2,448,780 to Crumrine describes an animal trap that traps, electrocutes and disposes of the animal carcass automatically. Injuring or killing the animal may be undesirable. Disposing of a rotting carcass may often pose health hazards and many individuals may object to the inhuman treatment of the animal.

A common design for trapping an animal without injury involves mechanically releasing a latch to close the opening in which the animal entered the enclosure. U.S. Pat. No. 5,867,934 to Conover describes an animal trap wherein a vertically sliding trap door is mechanically actuated by a swingably mounted bait holder. U.S. Pat. No. 5,862,624 to Askins describes an animal trap having a pivotally closing trap door actuated mechanically by an internal trip pan upon which the animal steps. U.S. Pat. No. 5,778,594 to Askins et al. describes a two door animal trap wherein vertically sliding doors on both ends of the trap are mechanically released when the animal steps on a trip pan within the enclosure. U.S. Pat. No. 5,345,710 to Bitz describes an animal trap having a vertically sliding trap door which is actuated by mechanical movement of a bait stick triggered by the animal. U.S. Pat. No. 5,199,210 to Nastas describes a live animal trap having a vertically sliding trap door which is actuated by mechanical movement of a bait-holding tray. U.S. Pat. No. 4,159,590 to Palfalvy describes an animal capture device wherein the bait is connected to a cord which pulls out a door-retaining pin to enclose and trap the animal. U.S. Pat. No. 4,138,796 to Souza describes an animal capture device which initially traps the animal in a first compartment, scares the animal into a second compartment for holding and then resets the apparatus to continue its function. U.S. Pat. No. 3,113,395 to Van Kuren describes a non-electrically actuated animal trap using a trip wire to release a trap door and enclose the animal.

U.S. Pat. No. 1,488,312 to Bronson describes an electromagnetic animal trap wherein the weight of the animal on a base plate completes a circuit to swing a trap door shut. The movement is designed to scare the animal into a cage. Upon stepping off the base plate, the circuit breaks and the trap door swings back open. However, the Bronson patent requires a significant power source to operate properly and the intended operation of the device requires the animal to follow an expected behavior pattern by being frightened into a chute.

Consequently, there is a need in the art for an animal capture device that effectively and humanely retains the capture animal until it may be later release.

There is a further need in the art for an animal capture device with increased sensitivity to movement by the animal in order to prevent the animal's escape before the animal is effectively trapped.

There is a further need in the art for an animal capture device that permits the bait to draw the animal into the enclosure, yet prevents the animal from consuming the bait.

There is a further need in the art for an animal capture device that may be easily cleaned and disinfected after use.

There is a further need in the art for an animal capture device that shields vulnerable circuitry from destruction by the captured animal.

There is a further need in the art for an animal capture device that is simple and safe to operate.

However, in view of the prior art in at the time the present invention was made, it was not obvious to those of ordinary skill in the pertinent art how the identified needs could be fulfilled.

SUMMARY OF THE INVENTION

Generally described, the present invention provides an electronically actuated animal trap comprising an enclosure having a base, side walls, a roof, a rear wall, and a front end provided with an animal access opening. A vertically sliding door panel is mounted to the animal access opening having at least one door aperture dimensioned to receive at least one retention pin oriented in a substantially perpendicular fashion to the sliding door panel. The sliding door panel has a first raised configuration and a second lower configuration. In the first raised configuration, an animal may either enter or exit the enclosure through the animal access opening. However, in the second lower configuration, the animal may neither enter nor exit the enclosure.

The retention pins hold up the sliding door panel when in the first raised configuration. Biasing means adapted to urge the retention pins through at least one door aperture is provided. A solenoid is adapted to retract the retention pins from the door apertures when a voltage is applied to the solenoid. A voltage source is provided to power the solenoid through a circuit. The voltage source may be battery powered or connected to an external power supply. A means for connecting the solenoid to the voltage source may be accomplished through standard wiring or solid-state circuitry.

An animal trigger switch is disposed within the enclosure and adapted to close upon movement by an animal within the enclosure. Wiring, solid-state circuitry or other suitable means connects the animal trigger switch to the circuit. When the animal moves within the enclosure, the animal trigger switch closes the circuit which enables the solenoid to receive power from the voltage source. The solenoid then retracts the retention pins from the door apertures causing the sliding door panel to vertically drop from the first raised configuration to the second lowered configuration. The animal access opening is thereby closed off by the sliding door panel.

In a preferred embodiment, the enclosure further comprises a bait area located within the enclosure, distal to the animal access opening. A vertically oriented trigger panel is swingably hinged to the roof and disposed between the bait area and the animal access opening. An animal trigger switch is adapted to close the circuit when the vertically oriented trigger panel is swung towards the bait area. To prevent the animal from entering the bait area, it is preferred that the hinged travel of the vertically oriented trigger panel is restricted so that the animal may not crawl under it. The bait area may be accessed through a bait door which is secured against outside entry by the animal.

The animal may also be more drawn to the bait if it can see and smell the bait. Accordingly, the vertically oriented trigger panel may be constructed of transparent material with at least one or more apertures dimensioned to allow the bait odor to pass through. This permits the animal to easily detect the bait, and push the vertically oriented trigger panel thereby tripping the switch. Alternatively, a grid having apertures may also be used to form the vertically oriented trigger panel.

As an alternative to the vertically oriented trigger panel, an infrared averaging detector and circuitry adapted to close the circuit upon detection of an animal within the enclosure may be provided.

When the animal is captured, it will often be desirable to move the trap to another location for the animal to be released. A handle may be attached to the enclosure to permit carrying of the trap.

As the trap can function for extended periods of time with little electric power, it may be placed in remote locations for long durations. As the continual checking of the traps can be inefficient and cumbersome, a radio frequency transmitting means may be integrated into the circuitry of the trap. When the trap closes, a radio frequency signal is sent to notify a user that the trap has been activated.

In order to ensure the captured animal has sufficient air to breath, at least one or more air holes may be formed in the enclosure. The air holes are sufficiently large to permit breathing by the captured animal while sufficiently small to keep the captured animal from escaping the enclosure.

Some animals are proficient at escaping traps and may successfully push the sliding door panel up from the second lower configuration to the first raised configuration enabling them to escape. In order to prevent this from happing, at least one locking door aperture may be formed in the sliding door panel and arranged to receive the retention pins when the slide door panel is in said second lower configuration. However, to reopen the trap, the retention pins must be pushed back out of the locking door aperture and the sliding door panel raised up. In a preferred embodiment, a manual switch is provided whereby closing the manual switch provides voltage to the solenoid causing the retention pins to retract from the locking door aperture thereby permitting the sliding door panel to be returned from the second lower configuration to the first raised configuration.

In a preferred embodiment, a door detector switch is provided which maintains the circuit when the sliding door panel is in the first raised configuration. When the sliding door panel drops down to seal off the enclosure, the door detector switch breaks the circuit. The purpose of the door detector switch is that once the animal is trapped, the animal may continue to activate the solenoid thereby using up the voltage source. However, once the door detector switch is no longer closed, the solenoid may no longer receive voltage by movement within the enclosure.

Many animals, particularly rodents, may gnaw on exposed wires and circuitry. Accordingly, it is beneficial that the circuitry be shielded from the animal. In one embodiment, an exterior roof and an interior roof sandwich the circuitry, solenoid, retention pins, biasing means, and other vulnerable mechanisms. Alternatively, the vulnerable mechanisms and circuitry may be enclosed within the base or side walls.

The enclosure may be constructed of a mesh structure, either wire, polymer or another suitable material. Alternatively, it may be solid formed. It order to easily observe the captured animal, it is preferable that the roof be constructed of transparent material to view the contents of the enclosure.

Accordingly, it is an object of the present invention to provide an animal capture device that effectively and humanely retains the capture animal until it may be later release.

It is another object of the present invention to provide an animal capture device with increased sensitivity to movement by the animal in order to prevent the animal's escape before the animal is effectively trapped.

It is another object of the present invention to provide an animal capture device that permits the bait to draw the animal into the enclosure, yet prevents the animal from consuming the bait.

It is another object of the present invention to provide an animal capture device that may be easily cleaned and disinfected after use.

It is another object of the present invention to provide an animal capture device that shields vulnerable circuitry from destruction by the captured animal.

It is another object of the present invention to provide an animal capture device that is simple and safe to operate.

An advantage of the invention is that the triggering mechanism is highly sensitive enabling the device to capture a wide variety of animals.

Another advantage of the invention is that the animal is not injured in the capture process.

Another advantage of the invention is that the animal does not consume the bait which may then be reused. Additionally, as the animal does not eat the bait, there is less mess to clean up after the animal is trapped.

Another advantage of the invention is that no high-tension springs or mechanisms are utilized that may injure the trap-setter.

Another advantage of the invention is that minimal voltage is required to power the solenoid which makes the trap particularly useful for extended remote operation in the field.

Another advantage of the invention is that it is easily operated by the trap-setter.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1A is a sectional elevated side view of the invention in an open configuration.

FIG. 1B is an elevated front view of the vertically oriented trigger panel.

DETAILED DESCRIPTION OF THE PREFERRED EMBODIMENT

Referring initially to FIG. 1, it will there be seen that an illustrative embodiment of the present invention is denoted by the reference number 10 as a whole.

Figure 2:
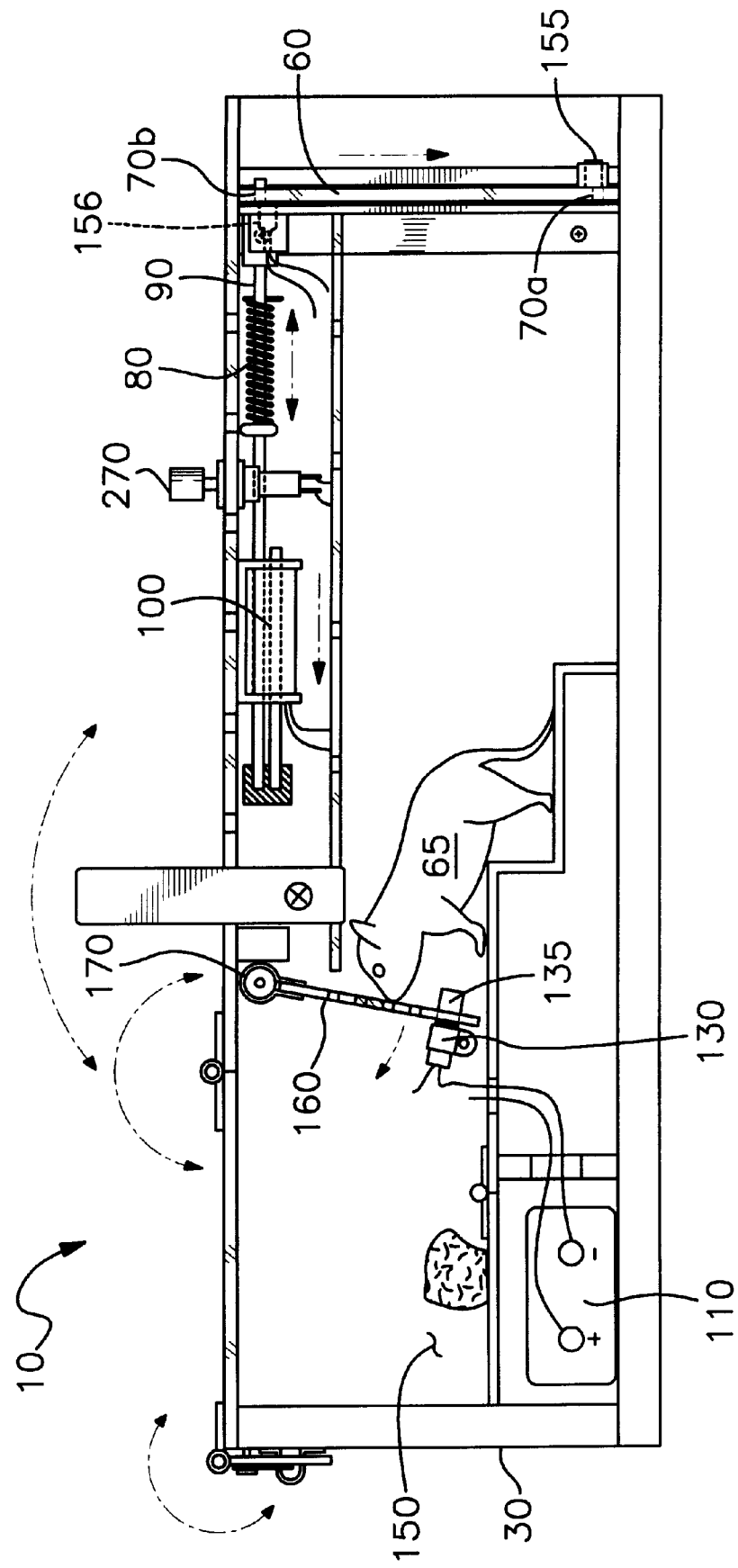
FIG. 2 is a sectional elevated side view of the invention showing an animal pushing the vertically oriented trigger panel causing the sliding door panel to drop down and trap the animal.

A rear side 30, a front side 40, a bottom 20, an exterior roof 55 and side walls form an enclosure with an animal access opening 50. A vertically sliding door panel 60 is mounted to said animal access opening 50. At least one door aperture 70a is provided in said animal access opening 50 and receives at least one retention pin 90 oriented in a substantially perpendicular fashion to said sliding door panel 60. Said sliding door panel 60 has a first raised configuration as shown in FIG. 1 and a second lower configuration as shown in FIG. 2. Returning back to FIG. 1, a biasing means 80 is adapted to urge said at least one retention pin 90 through said at least one door aperture 70a which said sliding door panel 60 is in said first raised configuration.

Figure 4:
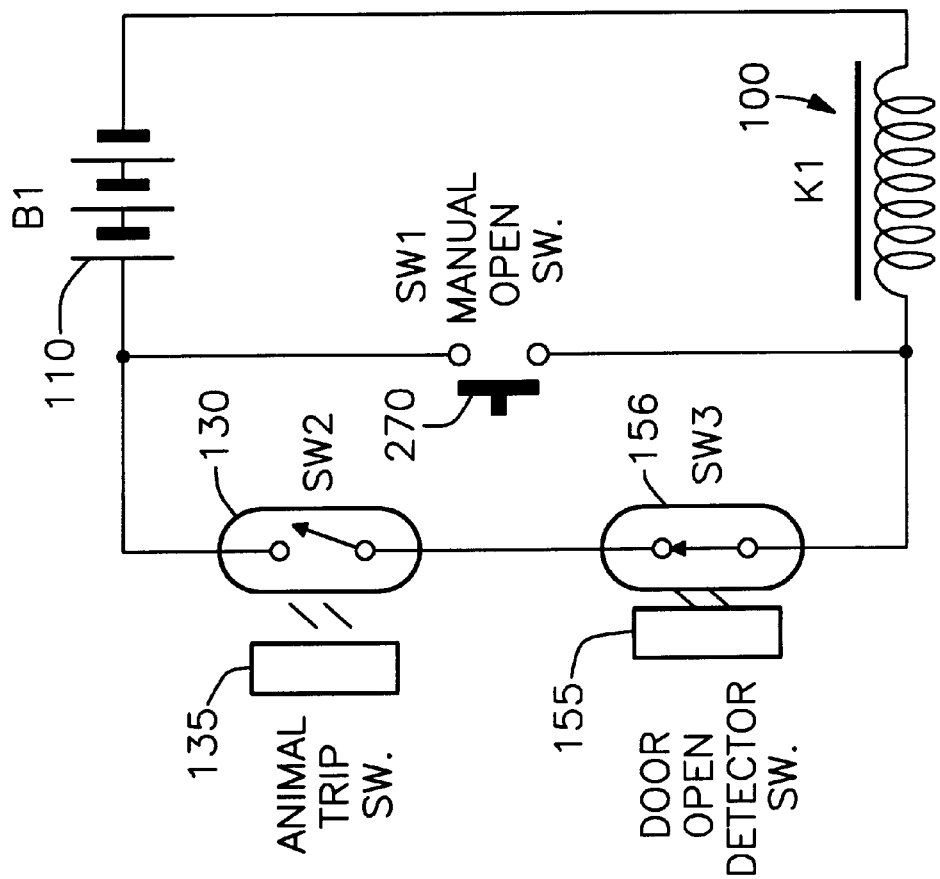
FIG. 4 is a diagrammed view of the circuitry of the trap utilizing a magnetic coupler trigger switch to activate the solenoid.

A solenoid 100 is adapted to retract said at least one retention pin 90 from said at least one door aperture 70a when a voltage is applied to said solenoid 100. A means is provided for connecting said solenoid 100 to a voltage source 110 through a circuit as shown in FIG. 4. An animal trigger switch 130 disposed within said enclosure and adapted to close said circuit upon movement by an animal 65 within said enclosure. More specifically, a magnetic coupling 135 is pushed into contact with said animal trigger switch 130 by said animal 65 thereby closing said circuit. Voltage from said voltage source 110 is thereby delivered to said solenoid 100 which causes said at least one retention pin 90 to retract from said at least one door aperture 70a thereby causing said sliding door panel 60 to vertically drop from said first raised configuration to said second lowered configuration wherein said animal access opening 50 is closed off by said sliding door panel 60.

An open door detector switch 156 is integrated into said animal access opening 50 An opposing magnetic coupler 155 mounted to said sliding door panel 60 maintains said circuit when said sliding door panel 60 is in said first raised configuration and breaks said circuit when said sliding door panel 60 is in said second lower configuration. This prevents the solenoid 100 from repeatedly activating by the trapped animal's movements within said enclosure.

Figure 3:
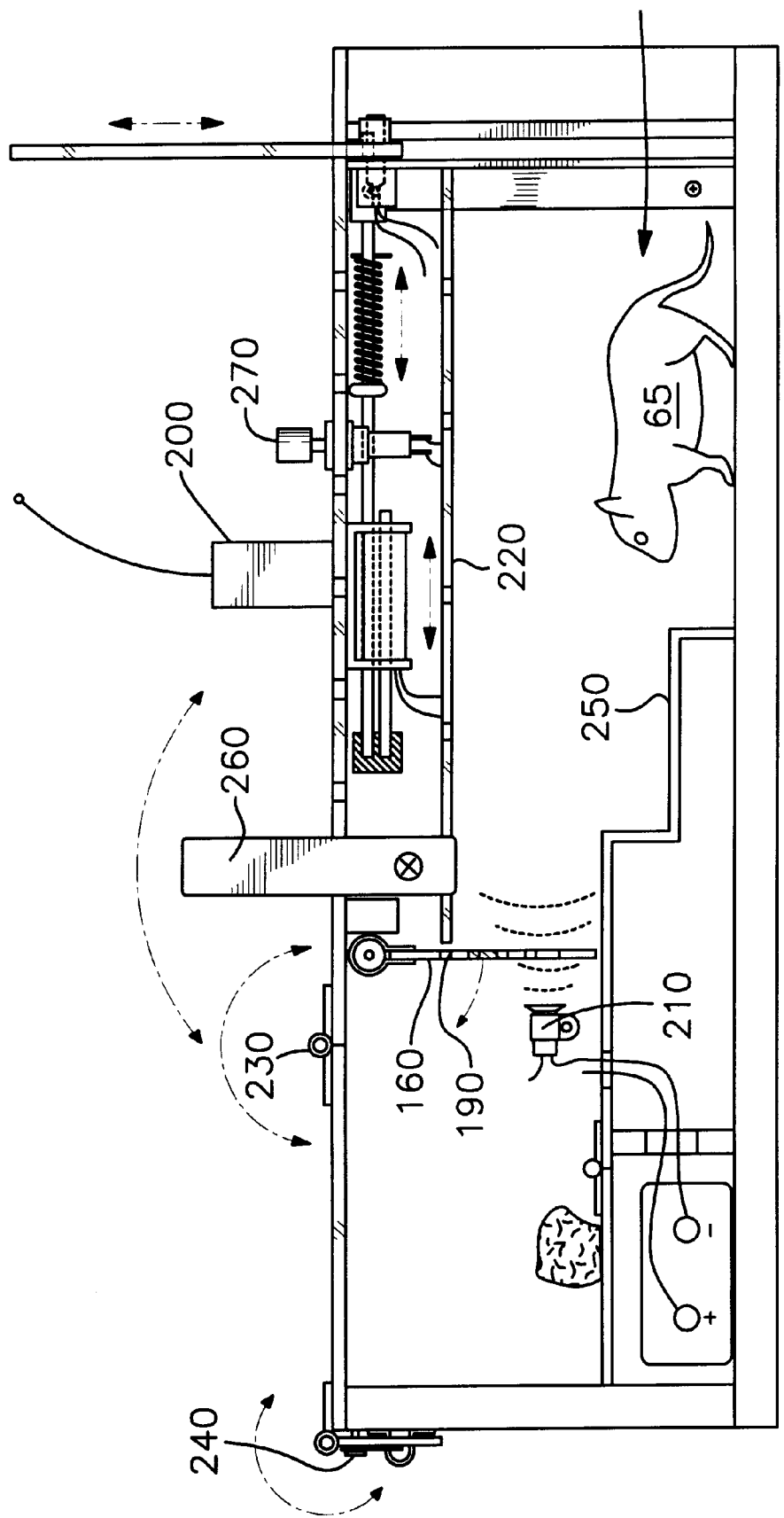
FIG. 3 is a sectional elevated side view of an alternative embodiment of the invention comprising an infrared averaging detector and circuitry and radio-frequency transmitter.

A bait area 150 is located within said enclosure distal to said animal access opening 50. Said animal trigger switch 130 is mounted to a vertically oriented trigger panel 160 swingably hinged 170 to said exterior roof 55. Said vertically oriented trigger panel 160 is disposed between said bait area 150 and said animal access opening 50. As shown in FIG. 3, said bait area 150 is accessible through a hinged section 230 of the exterior roof and is secured from outside intrusion by a locking means 240.

FIG. 1B shows a detail of a vertically oriented trigger panel 160 constructed of transparent material and having a plurality of apertures 190 allowing said animal 65 to both smell and view the bait in the bait area 150. The animal trigger switch 130 may be mounted in such as location 180 as to restrict movement of the vertically oriented trigger panel 150 so that said animal 65 does not have access to the bait area 150.

Another feature illustrated in FIG. 1 is the protection of the electrical components by providing an interior roof 220. Said interior roof 220 prevents said animal 65 from gnawing the wires and mechanical components. It is also preferred that both the said exterior roof 55 and said interior roof 220 be constructed of transparent material so that the user can easily observe the contents of said enclosure. Air holes 190 may also be provided through said enclosure so that said animal 65 is able to breathe.

In order to enable easy transportation of the enclosure, a handle 260 may be provided from which the enclosure depends as shown in FIG. 3.

FIG. 2 illustrates said animal 65 pushing said vertically oriented trigger panel 160 towards said bait area 150. Said magnetic coupling 135 is pushed into contact with said animal trigger switch 130 thereby closing said circuit. Voltage is then transferred from said voltage source 110 to said solenoid 100. Said solenoid 100 retracts said at least one retention pin 90 from said at least one door apertures 70a causing said sliding door panel 60 to fall vertically downward and cover said animal access opening 50. As said opposing magnetic coupler 155 is no longer in connection with said open door detector switch 156, voltage is no longer applied to said solenoid 100. Said biasing means 80 then urge said at least one retention pin 90 against said sliding door panel 60. To prevent said animal 65 from pushing up said sliding door panel 60 in an attempt to escape, at least one locking door aperture 70b is provided which received said at least one retention pin 90 thereby securing said sliding door panel 60 from upward movement. A manual switch 270 is provided whereby closing said manual switch applies voltage to said solenoid 100 thereby retracting said at least one retention pin 90 from said at least one or more locking door aperture 70b so that the trap may be reset for another capture. The circuitry is illustrated in FIG. 4.

Figure 5:
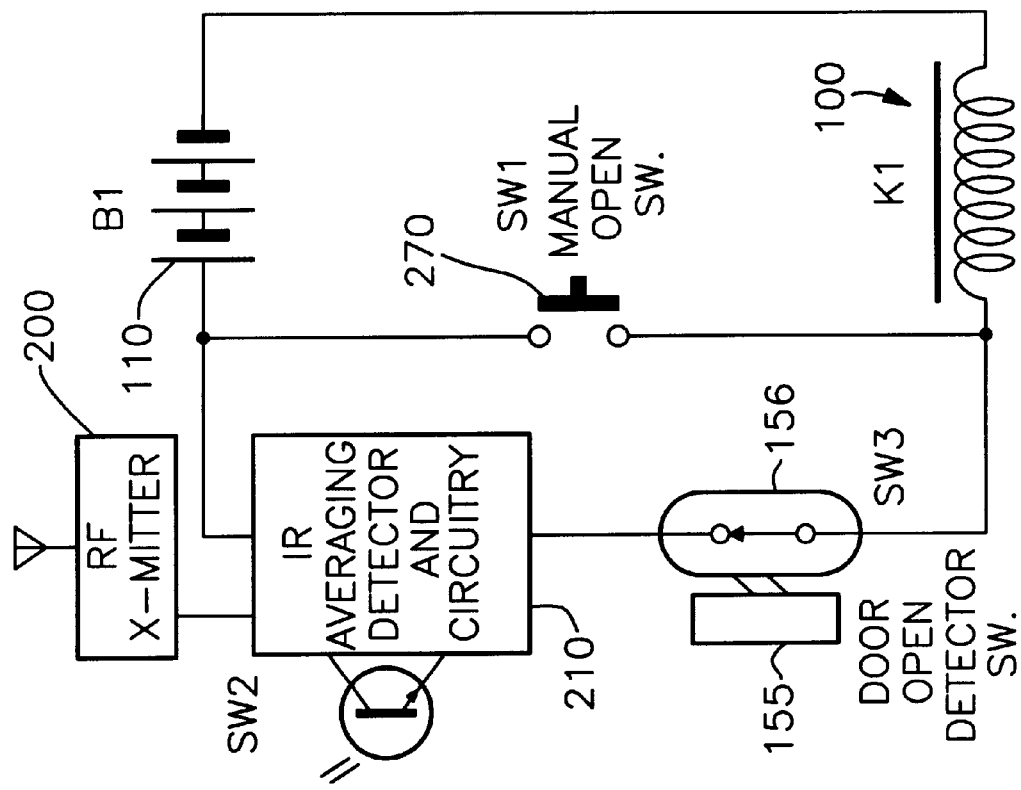
FIG. 5 is a diagrammed view of the circuitry of the trap utilizing an infrared averaging detector and circuitry to activate the solenoid.

FIG. 3 illustrates several alternative embodiments of the invention including an infrared averaging detector and circuitry 210 for detecting movement within said enclosure which triggers said solenoid 100. Another alternative feature of the invention is a radio-frequency transmitter 200 coupled to said circuit. In the event that the trap is activated, a signal is sent to a remote receiver to notify the user. The circuitry of said infrared averaging detector and circuitry 210 and said radio-frequency transmitter 200 is illustrated in FIG. 5.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An electronically actuated animal trap comprising
   (a) an enclosure having a base, side walls, a roof, a rear wall, and a front end provided with an animal access opening;
   (b) a vertically sliding door panel mounted to said animal access opening having at least one door aperture dimensioned to receive at least one retention pin oriented in a substantially perpendicular fashion to said sliding door panel said sliding door panel having a first raised configuration and a second lower configuration;
   (c) a biasing means adapted to urge said at least one retention pin through said at least one door aperture while said sliding door panel is in said first raised configuration;
   (d) a solenoid adapted to retract said at least one retention pin from said at least one door aperture when a voltage is applied to said solenoid;
   (e) a voltage source adapted to power said solenoid through a circuit;
   (f) an animal trigger switch disposed within said enclosure, said animal trigger switch adapted to close upon movement by an animal within said enclosure;
   (g) a means for connecting said animal trigger switch to said circuit whereby said sliding door panel being vertically positioned in said first raised configuration when said at least one retention pin is received through said at least one door aperture thereby securing said sliding door panel in said first raised configuration and providing access to said enclosure via said animal access opening;
   (h) whereby movement within said enclosure triggers said animal trigger switch thereby closing said circuit so that said solenoid receives power from said voltage source causing said at least one retention pin to retract from said at least one door aperture thereby causing said sliding door panel to vertically drop from said first raised configuration to said second lowered configuration wherein said animal access opening is closed off by said sliding door panel.

2. The electronically actuated animal trap of claim 1 further comprising:
   (a) a bait area located within said enclosure distal to said animal access opening;
   (b) a vertically oriented trigger panel swingably hinged to said roof and disposed between said bait area and said animal access opening;
   (c) a trigger panel switch adapted to close said circuit when said vertically oriented trigger panel is swung towards said bait area.

3. The electronically actuated animal trap of claim 2 wherein hinged travel of said vertically oriented trigger panel is restricted to prevent an animal from entering said bait area.

4. The electronically actuated animal trap of claim 2 wherein said vertically oriented trigger panel is constructed of transparent material.

5. The electronically actuated animal trap of claim 2 further comprising at least one aperture in said vertically oriented trigger panel.

6. The electronically actuated animal trap of claim 1 further comprising a handle from which said enclosure depends.

7. The electronically actuated animal trap of claim 1 further comprising a radio frequency transmitting means adapted to send a signal when said circuit is closed.

8. The electronically actuated animal trap of claim 1 wherein said animal trigger switch further comprises an infrared averaging detector and circuitry adapted to close said circuit upon detection of an animal within said enclosure.

9. The electronically actuated animal trap of claim 1 further comprising at least one air hole formed in said enclosure, dimensioned to permit breathing by a captured animal while keeping said captured animal within said enclosure.

10. The electronically actuated animal trap of claim 1 further comprising a least one locking door aperture formed in said sliding door panel and arranged to receive said at least one retention pin when said sliding door panel is in said second lower configuration.

11. The electronically actuated animal trap of claim 10 further comprising a manual switch whereby closing said manual switch permits said at least one retention pin to retract from said at least one locking door aperture thereby permitting said sliding door panel to be returned from said second lower configuration to said first raised configuration.

12. The electronically actuated animal trap of claim 1 further comprising an open door detector switch maintaining said circuit when said sliding door panel is in said first raised configuration and breaking said circuit when said sliding door panel is in said second lower configuration.

13. An electronically actuated animal trap comprising
   (a) an enclosure having a base, side walls, an exterior roof, an interior roof, a rear wall, and a front end provided with an animal access opening;
   (b) a vertically sliding door panel mounted to said animal access opening having at least one door aperture dimensioned to receive at least one retention pin oriented in a substantially perpendicular fashion to said sliding door panel said sliding door panel having a first raised configuration and a second lower configuration;
   (c) a biasing means adapted to urge said at least one retention pin through said at least one door aperture while said sliding door panel is in said first raised configuration;
   (d) a solenoid adapted to retract said at least one retention pin from said at least one door aperture when a voltage is applied to said solenoid;
   (e) a voltage source adapted to power said solenoid through a circuit;
   (f) a bait area located within said enclosure distal to said animal access opening;
   (g) a vertically oriented trigger panel swingably hinged to said roof and disposed between said bait area and said animal access opening;
   (h) an animal trigger switch adapted to close said circuit when said vertically oriented trigger panel is swung towards said bait area;
   (i) a means for connecting said animal trigger switch to said circuit;
   (j) whereby said sliding door panel is vertically positioned to said first raised configuration when said at least one retention pin is received through said at least one door aperture thereby securing said sliding door panel in said first raised configuration and providing access to said enclosure via said animal access opening, movement within said enclosure triggers said animal trigger switch thereby closing said circuit so that said solenoid receives power from said voltage source causing said at least one retention pin to retract from said at least one door aperture thereby causing said sliding door panel to vertically drop from said first raised configuration to said second lowered configuration wherein said animal access opening is closed off by said sliding door panel.

14. The electronically actuated animal trap of claim 13 wherein said solenoid, said at least one retention pin, said means for connecting said solenoid to said voltage source, and said biasing means are disposed between said exterior roof and said interior roof.

15. The electronically actuated animal trap of claim 13 wherein said exterior roof and said interior roof are constructed of transparent material.

16. An electronically actuated animal trap comprising
 (a) an enclosure having a base, side walls, a transparent exterior roof, a transparent interior roof, a rear wall, and a front end provided with an animal access opening;
 (b) a handle from which said electronically actuated animal trap depends;
 (c) at least one air hole formed in said enclosure dimensioned to permit breathing by a captured animal while keeping said captured animal within said enclosure;
 (d) a vertically sliding door panel mounted to said animal access opening having a plurality of door apertures dimensioned to receive at least one retention pin oriented in a substantially perpendicular fashion to said sliding door panel said sliding door panel having a first raised configuration and a second lower configuration;
 (e) a least one locking door aperture formed in said sliding door panel and arranged to receive said at least one retention pin when said slide door panel is in said second lower configuration;
 (f) a biasing means adapted to urge said at least one retention pin through said at least one door aperture while said sliding door panel is in said first raised configuration;
 (g) a solenoid disposed adapted to retract said at least one retention pin from said at least one door aperture when a voltage is applied to said solenoid;
 (h) a voltage source adapted to power said solenoid through a circuit;
 (i) a bait area located within said enclosure distal to said animal access opening;
 (j) a vertically oriented trigger panel swingably hinged to said roof and disposed between said bait area and said animal access opening;
 (k) an animal trigger switch adapted to close said circuit when said vertically oriented trigger panel is swung towards said bait area;
 (l) a means for connecting said animal trigger switch to said circuit whereby said sliding door panel being vertically positioned to said first raised configuration when said at least one retention pin is received through said at least one door aperture thereby securing said sliding door panel in said first raised configuration and providing access to said enclosure via said animal access opening;
 (m) a manual switch connected to said circuit adapted to power said solenoid upon closure;
 (n) an open door detector switch maintaining said circuit when said sliding door panel is in said first raised configuration and breaking said circuit when said sliding door panel is in said second lower configuration;
 (o) whereby movement within said enclosure triggers said animal trigger switch thereby closing said circuit so that said solenoid receives power from said voltage source causing said at least one retention pin to retract from said at least one door aperture thereby causing said sliding door panel to vertically drop from said first raised configuration to said second lowered configuration wherein said animal access opening is closed off by said sliding door panel thereby securing said enclosure, closing said manual switch permits said at least one retention pin to retract from said at least one locking door aperture thereby permitting said sliding door panel to be returned from said second lower configuration to said first raised configuration.

\* \* \* \* \*